United States Patent
Kuroba et al.

(10) Patent No.: US 11,952,070 B2
(45) Date of Patent: Apr. 9, 2024

(54) STRADDLE TYPE VEHICLE

(71) Applicant: HONDA MOTOR CO., LTD., Tokyo (JP)

(72) Inventors: Yoshiyuki Kuroba, Wako (JP); Hiroshi Maeda, Wako (JP); Masashi Hagimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 748 days.

(21) Appl. No.: 17/012,232

(22) Filed: Sep. 4, 2020

(65) Prior Publication Data
US 2020/0398924 A1 Dec. 24, 2020

Related U.S. Application Data

(63) Continuation of application No. PCT/JP2018/011822, filed on Mar. 23, 2018.

(51) Int. Cl.
| | |
|---|---|
| *B62J 6/027* | (2020.01) |
| *B62J 6/026* | (2020.01) |
| *B62J 27/00* | (2020.01) |
| *B62J 45/41* | (2020.01) |
| *B62J 45/42* | (2020.01) |

(Continued)

(52) U.S. Cl.
CPC .............. *B62J 6/027* (2020.02); *B62J 6/026* (2020.02); *B62J 27/00* (2013.01); *B62J 45/41* (2020.02); *B62J 45/42* (2020.02); *B62J 50/22* (2020.02); *B62J 50/225* (2020.02); *B60Y 2200/12* (2013.01)

(58) Field of Classification Search
CPC ... B62J 6/027; B62J 6/026; B62J 27/00; B62J 45/41; B62J 45/42; B62J 50/22; B62J 50/225; B62J 17/02; B60Y 2200/12; B62K 11/04
See application file for complete search history.

(56) References Cited

U.S. PATENT DOCUMENTS

| | | |
|---|---|---|
| 10,166,909 B2 | 1/2019 | Suzuki et al. |
| 10,562,477 B2 | 2/2020 | Fuchs et al. |

(Continued)

FOREIGN PATENT DOCUMENTS

| | | |
|---|---|---|
| DE | 102011002894 A1 | 7/2012 |
| JP | 2015140029 A | 8/2015 |

(Continued)

OTHER PUBLICATIONS

International Search Report for PCT/JP2018/011822 dated Jun. 12, 2018.

*Primary Examiner* — Kabir A Timory
(74) *Attorney, Agent, or Firm* — Thomas| Horstemeyer, LLP (57) ABSTRACT

A straddle type vehicle includes a front cowl configured to cover a front part of the vehicle, a shield arranged above the front cowl, and a detecting unit configured to detect a situation in front of the vehicle. The detecting unit includes at least an image capturing unit that is positioned above a lower end of the front cowl and in a central portion of the straddle type vehicle in a vehicle width direction, and is arranged in a position where the shield does not interfere with an image capturing range. The image capturing unit is arranged behind an upper portion of the front cowl.

8 Claims, 8 Drawing Sheets

(51) Int. Cl.
B62J 50/21      (2020.01)
B62J 50/22      (2020.01)

(56) References Cited

U.S. PATENT DOCUMENTS

| | | |
|---|---|---|
| 2017/0327026 A1 | 11/2017 | Suzuki et al. |
| 2019/0161042 A1 | 5/2019 | Fuchs et al. |
| 2020/0130771 A1* | 4/2020 | Jacobsz Rosier ...... B62K 23/02 |
| 2020/0247307 A1* | 8/2020 | Tsutsumi ................ B60R 11/04 |

FOREIGN PATENT DOCUMENTS

| | | |
|---|---|---|
| JP | 2016193660 A | 11/2016 |
| JP | 2017039487 A | 2/2017 |
| JP | 2017202810 A | 11/2017 |
| WO | 2017221410 A1 | 12/2017 |
| WO | 2019180941 A1 | 9/2019 |

* cited by examiner

STRADDLE TYPE VEHICLE

CROSS-REFERENCE TO RELATED APPLICATION

This application is a Continuation of International Patent Application No. PCT/JP2018/011822, filed Mar. 23, 2018, the entire disclosures of which is incorporated herein by reference.

BACKGROUND OF THE INVENTION

Field of the Invention

The present invention relates to a straddle type vehicle having a front detecting function.

Description of the Related Art

A straddle type vehicle having a function of detecting the existence of a front obstacle or the like and notifying the rider of the detection result has been proposed. For example, Japanese Patent Laid-Open No. 2017-39487 discloses a straddle type vehicle that includes a sensor such as an image capturing unit called a front sensing unit at the back of a screen and detects an obstacle or the like in front of the vehicle.

Unfortunately, the screen of a straddle type vehicle is generally formed by using a transparent resin material and hence can deteriorate or change its color with time. In an arrangement in which an image capturing unit is positioned at the back of the screen, the quality of a captured image decreases with time, and this sometimes decreases the front obstacle detection accuracy. When installing the image capturing unit in another portion of the vehicle as a measure against that, the installation portion is desirably a portion where the front detection range is wide and it is possible to more reliably avoid interference with a vehicle constituting part that displaces due to traveling.

SUMMARY OF THE INVENTION

It is an object of the present invention to provide a straddle type vehicle capable of maintaining the front detection accuracy of a vehicle for a long time period.

According to an aspect of the present invention, there is provided a straddle type vehicle comprising: a front cowl configured to cover a front part of the vehicle; a shield arranged above the front cowl; and a detecting unit configured to detect a situation in front of the vehicle, wherein the detecting unit includes at least an image capturing unit that is positioned above a lower end of the front cowl and in a central portion of the straddle type vehicle in a vehicle width direction, and is arranged in a position where the shield does not interfere with an image capturing range, and the image capturing unit is arranged behind an upper portion of the front cowl.

Further features of the present invention will become apparent from the following description of exemplary embodiments (with reference to the attached drawings).

DESCRIPTION OF THE EMBODIMENTS

A straddle type vehicle according to an embodiment of the present invention will be explained below with reference to the accompanying drawings. In each drawing, arrows X, Y, and Z indicate directions perpendicular to each other. The X direction indicates the front-and-rear direction of the straddle type vehicle, the Y direction indicates the vehicle width direction (left-and-right direction) of the straddle type vehicle, and the Z direction indicates the vertical direction. The left and right of the straddle type vehicle are the left and right in the traveling direction. The front or rear in the front-and-rear direction of the straddle type vehicle will simply be called the front or rear in some cases. Also, the inside or outside in the vehicle width direction (left-and-right direction) of the straddle type vehicle will simply be called the inside or outside in some cases.

<Outline of Straddle Type Vehicle>

Figure 1:
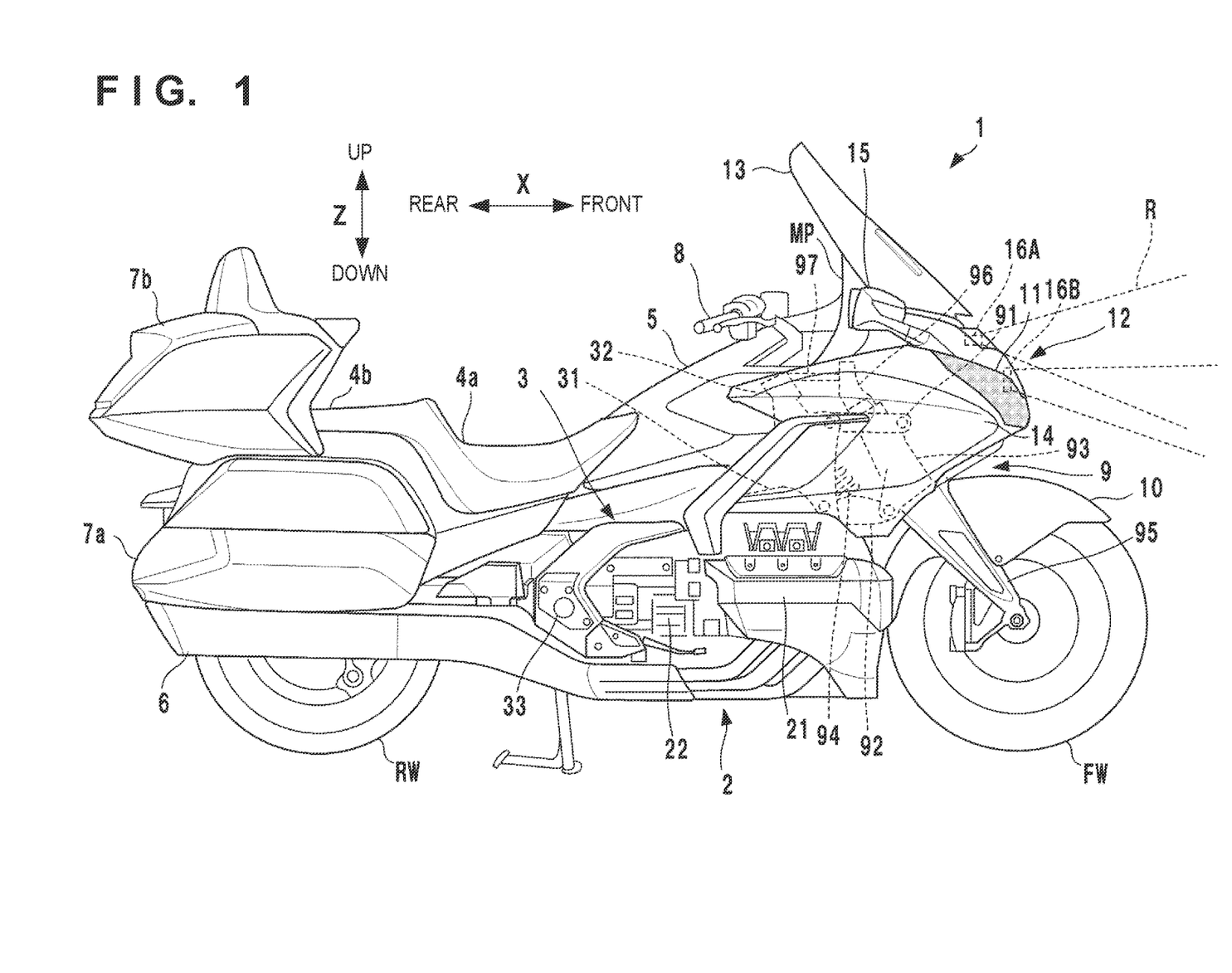
FIG. 1 is a side view of the right side of a straddle type vehicle according to an embodiment of the present invention.
Figure 2:
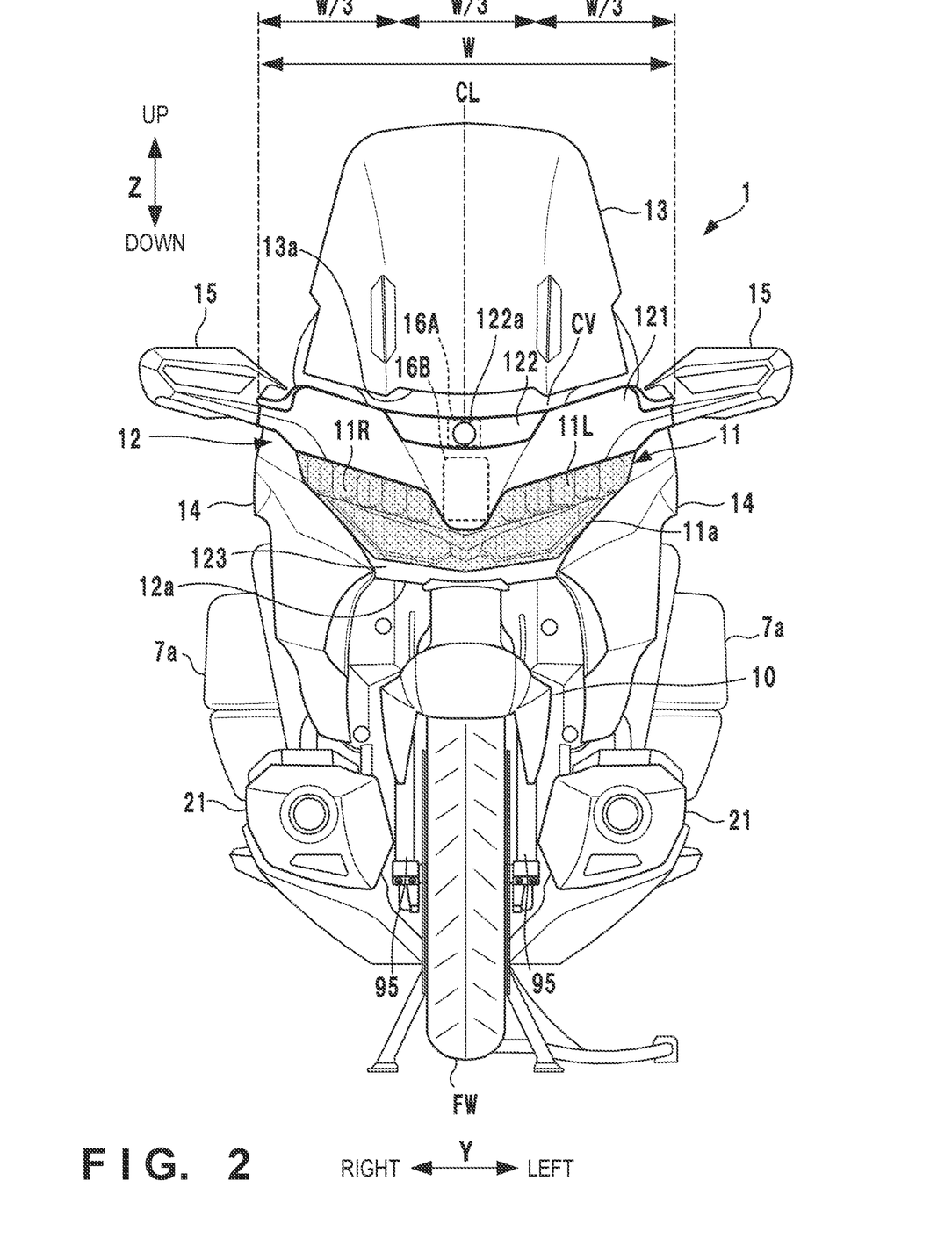
FIG. 2 is a front view of the straddle type vehicle shown in FIG. 1.
Figure 5:
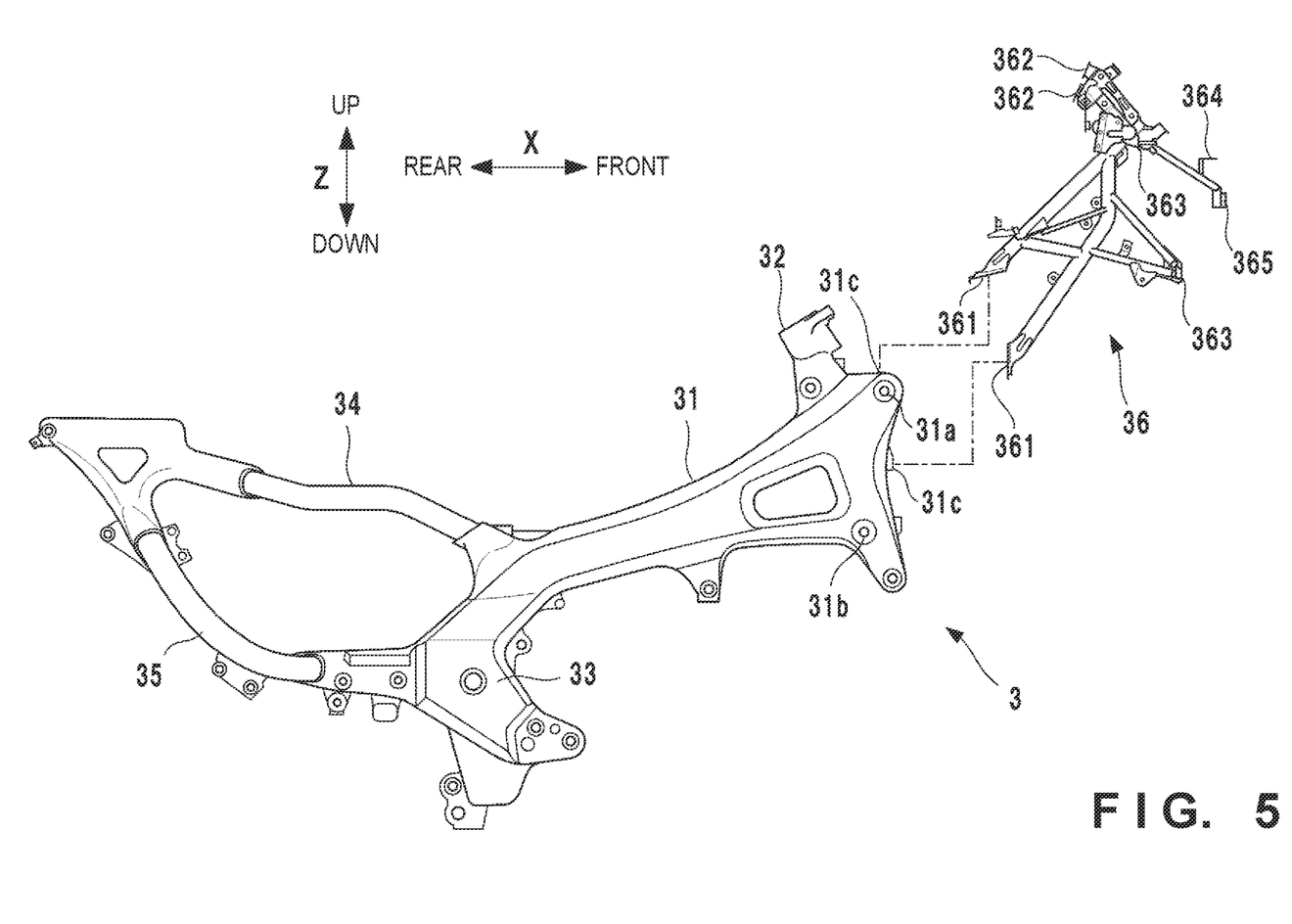
FIG. 5 is an exploded view of a vehicle body frame.

FIG. 1 is a side view of the right side of a straddle type vehicle 1 according to the embodiment of the present invention. FIG. 2 is a front view of the straddle type vehicle 1. FIG. 5 is an exploded view (a right side view) of a vehicle body frame 10 from which some parts are omitted.

The straddle type vehicle 1 is a touring motorcycle suitable for long-distance traveling. However, the present invention is applicable to various kinds of straddle type vehicles including motorcycles of other forms. The present invention is also applicable to a vehicle including an internal-combustion engine as a driving source, and an electric vehicle including a motor as a driving source. In the following description, the straddle type vehicle 1 will sometimes be called the vehicle 1.

The vehicle 1 includes a power unit 2 between a front wheel FW and a rear wheel RW. In this embodiment, the power unit 2 includes a flat-six engine 21 and a transmission 22. The driving force of the transmission 22 is transmitted to the rear wheel RW via a drive shaft (not shown) and rotates the rear wheel RW.

The power unit 2 is supported by a vehicle body frame 3. The vehicle body frame 3 includes a pair of left and right main frames 31 extended in the X direction. A fuel tank 5 and an air cleaner box (not shown) are arranged above the main frames 31. A meter panel MP for displaying various kinds of information to the rider is installed before the fuel tank 5.

Ahead pipe 32 for pivotally supporting a steerable shaft (not shown) that is pivoted by a handle 8 is attached to the front end portions of the main frames 31. A pair of left and right pivot plates 33 are attached to the rear end portions of the main frames 31. The lower end portions of the pivot plates 33 and the front end portions of the main frames 31 are connected by a pair of left and right lower arms (not shown), and the power unit 2 is supported by the main frames 31 and the lower arms. In addition, a pair of left and right seat rails 34 extending backward are formed in the rear end portions of the main frames 31, and support, for example, a seat 4a on which the rider sits, a seat 4b on which a fellow passenger sits, and a rear trunk 7b. The rear end portions of the seat rails 34 and the pivot plates 33 are connected by a pair of left and right sub frames 35.

The front end portion of a rear swing arm (not shown) extending in the front-and-rear direction is swingably supported by the pivot plates 33. The rear swing arm is vertically swingable, and its rear end portion supports the rear wheel RW. An exhaust muffler 6 for silencing the exhaust gas of the engine 21 extends in the X direction in the lower side portion of the rear wheel RW. Left and right saddlebags 7a are formed on the upper side portions of the rear wheel RW.

A front suspension mechanism 9 for supporting the front wheel FW is formed in the front end portions of the mainframes 31. The front suspension mechanism 9 includes an upper link 91, a lower link 92, a fork support member 93, a cushion unit 94, and a pair of left and right front forks 95.

The upper link 91 and the lower link 92 are arranged to be vertically spaced apart from each other in the front end portions of the main frames 31. The rear end portions of the upper link 91 and the lower link 92 are swingably connected to support portions 31a and 31b (FIG. 5) formed in the front end portions of the main frames 31. The front end portions of the upper link 91 and the lower link 92 are swingably connected to the fork support member 93. The upper link 91 and the lower link 92 are arranged to extend in the front-and-rear direction and to be practically parallel to each other.

The cushion unit 94 has a structure in which a shock absorber is inserted into a coil spring, and its upper end portion is swingably supported by the main frames 31. The lower end portion of the cushion unit 94 is swingably supported by the lower link 92.

The fork support member 93 is cylindrical and inclines backward. The front end portion of the upper link 91 is pivotally connected to the upper front portion of the fork support member 93. The front end portion of the lower link 92 is pivotally connected to the lower rear portion of the fork support member 93.

The fork support member 93 supports a steering shaft 96 so that it is rotatable around its axis. The steering shaft 96 has a shaft portion (not shown) inserted into the fork support member 93. A bridge (not shown) is formed in the lower end portion of the steering shaft 96, and supports the pair of left and right front forks 95. The front forks 95 rotatably support the front wheel FW. The upper end portion of the steering shaft 96 is connected to the steerable shaft (not shown) that is pivoted by the handle 8, via a link 97. When the handle 8 is steered, the steering shaft 96 rotates and steers the front wheel FW. The upper portion of the front wheel FW is covered with a fender 10, and the fender 10 is supported by the front forks 95.

<Front Structure>

Figure 3:
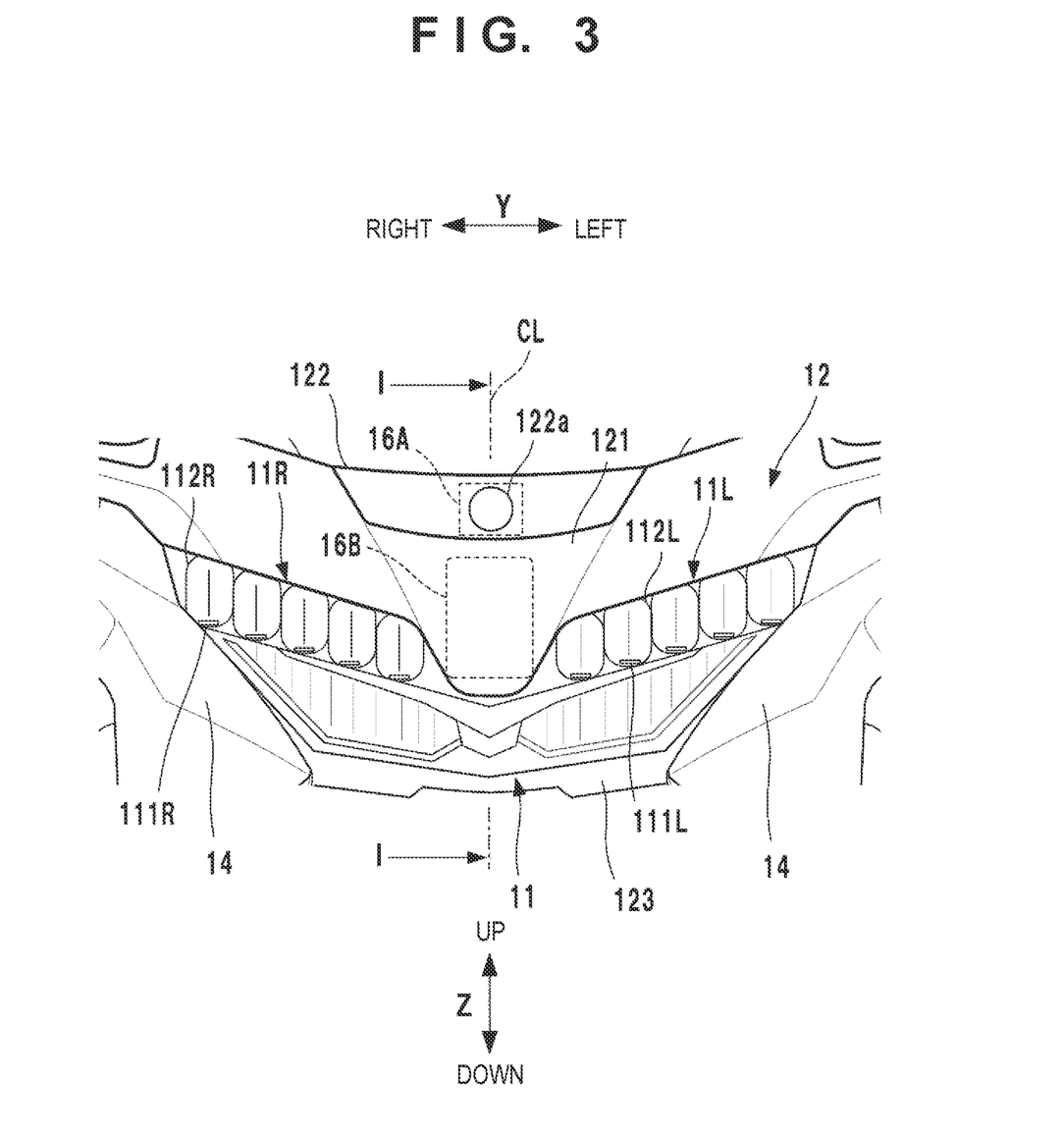
FIG. 3 is an enlarged view of the periphery of a headlight unit.

The front structure of the vehicle 1 will be explained with reference to FIGS. 1, 2, and 3. FIG. 3 is an enlarged view of the periphery of a headlight unit 11 of the vehicle 1. The headlight unit 11 for emitting light ahead of the vehicle 1 is arranged in the front part of the vehicle 1. The headlight unit 11 of this embodiment is a two-lamp headlight unit that symmetrically includes a right-side light emitting unit 11R and a left-side light emitting unit 11L. However, it is also possible to adopt a one-lamp or three-lamp headlight unit, or an asymmetrical two-lamp headlight unit.

The light emitting unit 11R includes a plurality of pairs (five pairs in this example shown in the drawing) of light sources 111R and reflectors 112R. The light source 111R is a light emitting element such as an LED. The reflector 112R is formed to surround the light source 111R from behind the light source 111R, and reflects light emitted by the light source 111R ahead of the vehicle 1. The light emitting unit 11L has the same arrangement such as that of the light emitting unit 11R, and includes a plurality of pairs (five pairs in this example shown in the drawing) of light sources 111L and reflectors 112L. The light source 11L is a light emitting element such as an LED. The reflector 112L is formed to surround the light source 111L from behind the light source 111L, and reflects light emitted by the light source 111L ahead of the vehicle 1. A lens member 11a is arranged in front of the headlight unit 11. The lens member 11a is formed by a transparent resin or the like. The lens member 11a of this embodiment is a single member so formed as to cover both the light emitting units 11R and 11L.

The front part of the vehicle 1 is covered with a front cowl 12, and the front side parts of the vehicle 1 are covered with a pair of left and right side cowls 14. A screen 13 is arranged in a portion above the front cowl 12 and outside a cover CV covering the meter panel MP. The screen 13 is a windshield for reducing the wind pressure that the rider receives during traveling, and is formed by, for example, a transparent resin member. The lower edge of the screen 13 includes a recess 13a that recesses upward, in the central portion of the lower edge in the vehicle width direction. When the traveling wind is allowed to enter between the screen 13 and the cover CV by forming the recess 13a, it is sometimes possible to suppress the generation of a negative pressure behind the screen 13.

A pair of left and right sideview mirror units 15 are arranged on the sides of the front cowl 12. The sideview mirror units 15 support sideview mirrors (not shown) by which the rider visually confirms the situation behind the vehicle.

In this embodiment, the front cowl 12 includes cowl members 121 to 123. The cowl member 121 extends in the Y direction and forms the main body of the front cowl 12. The cowl member 122 forms a portion above the cowl member 121. The cowl member 123 is spaced apart downward from the cowl member 121.

An opening for exposing the headlight unit 11 is formed between the cowl members 121 and 123, and between the pair of left and right side cowls 14. The cowl member 121 defines the upper edge of this opening, the cowl member 123 defines its lower edge, and the side cowls 14 define the left and right side edges.

An image capturing unit 16A and a radar 16B are arranged behind the front cowl 12, as detecting devices for detecting the situation before the vehicle 1. The radar 16B is, for example, a millimeter-wave radar. If these detecting devices detect an obstacle in front of the vehicle 1, some indication for drawing a riders attention can be performed on, for example, the meter panel MP.

In this embodiment, the image capturing unit 16A is arranged above a lower end 12a of the front cowl 12. The fender 10 may come close to the lower end 12a of the front cowl 12 due to the behavior of the front suspension mechanism 9 during traveling. Since, however, the image capturing unit 16A is arranged above the lower end 12a, interference between the image capturing unit 16A and the fender 10 can be avoided more reliably.

In this embodiment, the image capturing unit 16A is arranged behind the cowl member 122 that forms the upper portion of the front cowl 12. An opening 122a is formed to extend through the cowl member 122, and the image capturing unit 16A captures an image before the vehicle 1 through the opening 122a. Since the image capturing unit 16A is arranged above the front cowl 12 in the front view of the vehicle, it is possible to capture an image before the vehicle 1 from a higher position and obtain a wider image capturing range.

The image capturing unit 16A is arranged in a position where the shield 13 does not interfere with an image capturing range R (FIG. 1). In this embodiment, the image capturing unit 16A is positioned below and slightly before the shield 13. Accordingly, no image is captured through the shield 13, so the image quality does not deteriorate due to deterioration or color change of the shield 13 with time. This makes it possible to maintain the accuracy with which the image capturing unit 16A detects the situation in front of the vehicle 1 over a long time period. The opening 122a may also be covered with protective glass. Glass causes deterioration or color change less than that of a resin, so the transparency of glass can easily be maintained by cleaning it.

The radar 16B is arranged behind the cowl member 121. The existence of the cowl member 121 can make the existence of the detecting unit 16 inconspicuous in the front view of the vehicle 1, and makes it possible to avoid deterioration of the outer appearance of the vehicle 1. The cowl member 121 is formed by a material capable of transmitting an electromagnetic wave, for example, a resin.

The image capturing unit 16A and the radar 16B are arranged in the central portion of the front cowl 12 in the Y direction in the front view of the vehicle. As an example of an arrangement like this. FIG. 2 shows an arrangement in which when a width W of the front cowl 12 in the Y direction is equally divided into three portions, the image capturing unit 16A and the radar 16B are arranged such that their centers in the Y direction are positioned within the range of W/3 in the center. In this embodiment, the image capturing unit 16A and the radar 16B are particularly arranged on a central line CL of the vehicle 1 in the Y direction in the front view of the vehicle. In this embodiment, the central line CL is also the central line of the front cowl 12 in the Y direction.

Since the image capturing unit 16A and the radar 16B are arranged in the central portion of the vehicle 1 in the Y direction, it is possible to obtain a wider image capturing range and a wider detection range across the left and right areas before the vehicle 1, and detect the situation in front of the vehicle 1 without overlooking anything. Also, one image capturing unit 16A and one radar 16B can evenly monitor the left and right areas before the vehicle 1. This is particularly advantageous in an arrangement including not a plurality of image capturing units 16A and a plurality of radars 16B but one image capturing unit 16A and one radar 16B.

Furthermore, the shape of the front cowl 12 is flatter in the central portion than in the two end portions in the Y direction. Therefore, the image capturing unit 16A and the radar 16B can easily be arranged behind the front cowl 12. This is also advantageous in that the detection surfaces of the image capturing unit 16A and the radar 16B can easily be arranged in the target direction with respect to the area in front of the vehicle 1.

In this embodiment, the radar 16B is positioned between the light sources 111R and 111L in the front view of the vehicle 1. Therefore, the space between the right and left light sources 111R and 111L can effectively be utilized. In addition, the position of the radar 16B in the Z direction overlaps the positions of the right and left light sources 111R and 111L in the Z direction. This can avoid enlargement of the front part of the vehicle 1 in the Z direction.

Figure 4:
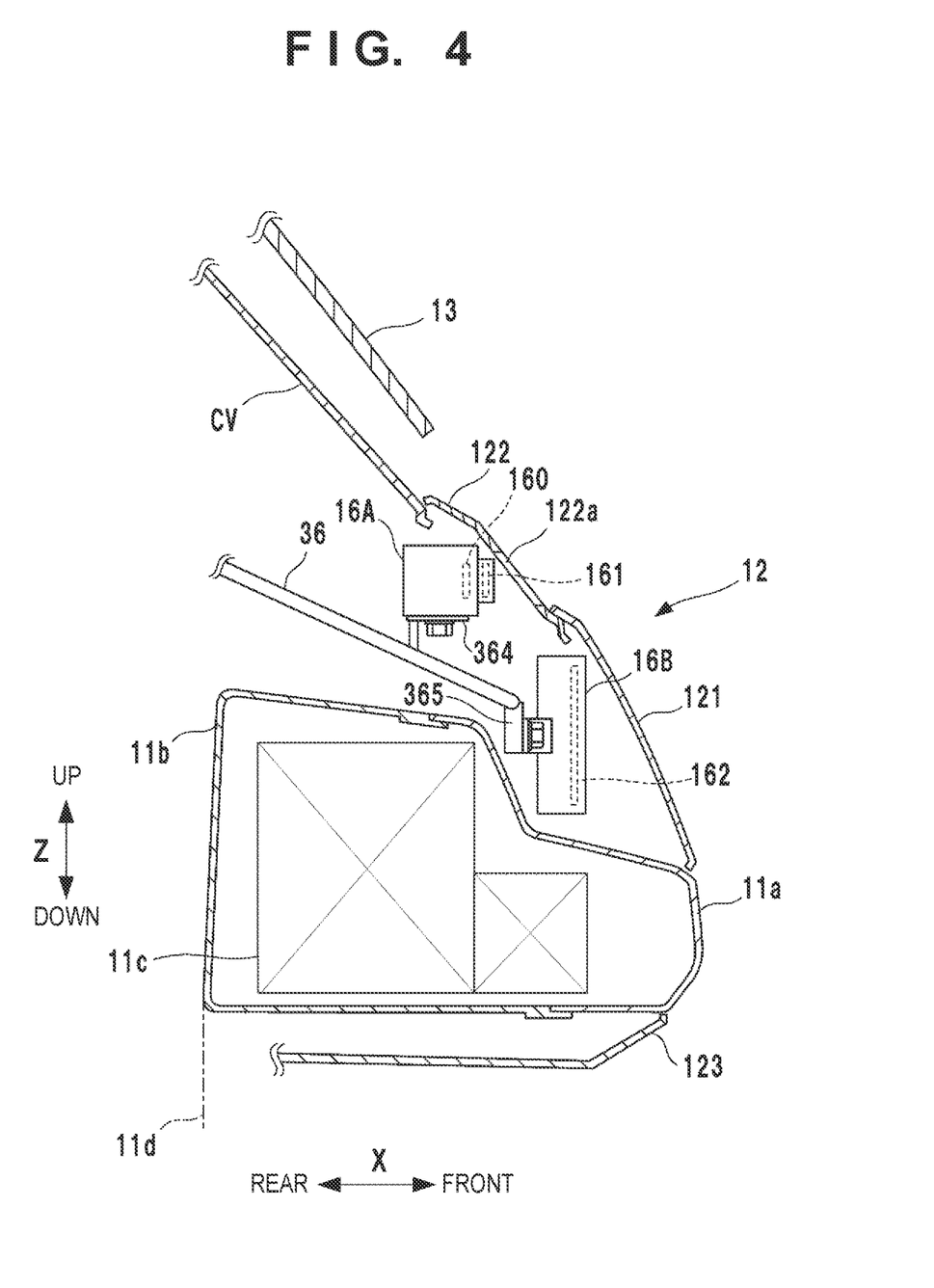
FIG. 4 is a sectional view taken along a line I-I in FIG. 3.

Next, the positions of the image capturing unit 16A and the radar 16B in the X and Z directions and the mounting structure thereof will be explained. FIG. 4 is a sectional view taken along a line I-I (the central line CL) in FIG. 3. The exterior of the headlight unit 11 of this embodiment is formed by the lens member 11a and a housing 11b, and an electric circuit 11d schematically shown in FIG. 4 is arranged in the internal space. The electric circuit 11d includes the light sources 111R and 111L described above, driving circuits for them, and the like.

At least one of the image capturing unit 16A and the radar 16B can be arranged inside the headlight unit 11. In this case, however, the headlight unit 11 may be enlarged or influenced by heat generated by the electric circuit. In this embodiment, therefore, both the image capturing unit 16A and the radar 16B are arranged outside the headlight unit 11.

The image capturing unit 16A of this embodiment has a structure in which an image capturing element 160 such as a CCD image sensor or a CMOS image sensor and an optical system 161 such as a lens are incorporated into the housing. The image capturing unit 16A is arranged so that its optical axis is directed to the area in front of the vehicle 1 through the opening 122a.

The radar 16B of this embodiment has a structure in which a signal transmitter/receiver 162 and other electric circuits (not shown) are accommodated in a boxy housing. The signal transmitter/receiver 162 is, for example, a circuit board on which an antenna for transmitting/receiving electromagnetic waves is formed. The signal transmitter/receiver 162 is arranged so that its substrate surface is almost perpendicular to the X direction. The detection accuracy may decrease if a metal part that obstructs the propagation of an electromagnetic wave is arranged before the signal transmitter/receiver 162.

In this embodiment, the signal transmitter/receiver 162 is positioned before the rear end 11d of the headlight unit 11 in the X direction. This makes it possible to avoid metal parts existing in the headlight unit 11 from interfering with the detection range of the radar 16B. To avoid this interference between the detection range of the detecting unit 16 and the metal parts, the signal transmitter/receiver 162 is preferably positioned before the headlight unit 11 as far as possible. The signal transmitter/receiver 162 can be positioned before not only the rear end 11d but also the center of the headlight unit 11 in the X direction. Furthermore, letting L be the length of the headlight unit 11 in the X direction, the signal transmitter/receiver 162 can also be positioned before a position of L/4 from the front end.

In this embodiment, the image capturing unit 16A is arranged after the signal transmitter/receiver 162 in the X direction. This can avoid metal parts existing in the image capturing unit 16A from interfering with the detection range of the radar 16B.

In this embodiment, the positional relationship between the image capturing unit 16A and the radar 16B in the Z direction is that the image capturing unit 16A is positioned on the upper side and the radar 16B is positioned on the lower side. However, this positional relationship may also be that the image capturing unit 16A is positioned on the lower side and the radar 16B is positioned on the upper side. When using the arrangement of this embodiment, however, the image capturing unit 16A can be installed in a higher position, so a wider image capturing range can be obtained. Also, the shape of the front cowl of the straddle type vehicle is generally inclining upward and backward, like the shape of the front cowl 12 of this embodiment, as shown in FIG. 4. When the image capturing unit 16A is arranged on the upper side, the image capturing unit 16A is consequently arranged behind the signal transmitter/receiver 162 in the X direction. This is a layout that easily avoids the metal parts existing in the image capturing unit 16A from interfering with the detection range of the radar 16B.

In this embodiment, the image capturing unit 16A and the radar 16B are spaced apart from the front cowl 12. In this example shown in FIG. 4, a gap is formed between the set of the image capturing unit 16A and the radar 16B and the set of the cowl members 122 and 121 positioned before them. A viscoelastic member such as rubber or sponge can be installed in this gap. Since the image capturing unit 16A and the radar 16B are spaced apart from the front cowl 12, the vibration of the front cowl 12 is not easily propagated to the image capturing unit 16A and the radar 16B, his can prevent shifts of the mounting positions of the image capturing unit 16A and the radar 16B, and prevent changes in direction of the detection surfaces.

Figure 6:
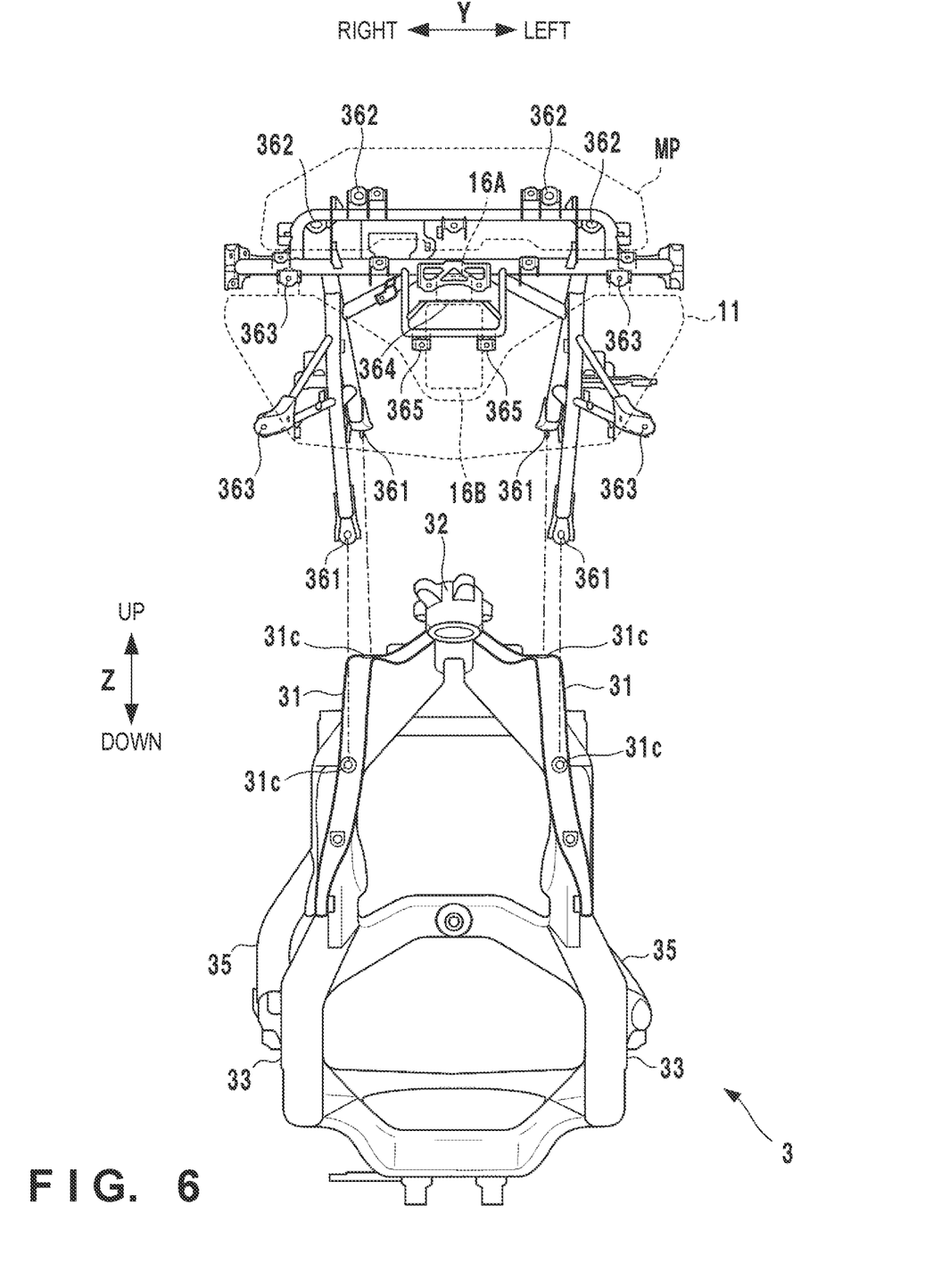
FIG. 6 is an exploded view of the vehicle body frame.

The mounting structure of the image capturing unit 16A and the radar 16B will now be explained with reference to FIGS. 4 to 6. FIG. 5 is a side view of the right side of a partial arrangement of the vehicle body frame 3 in an exploded state. FIG. 6 is a front view of the partial arrangement of the vehicle body frame 3 shown in FIG. 5.

In this embodiment, both the image capturing unit 16A and the radar 16B are supported by the mainframes 31. The mainframes 31 are members having high rigidity among other members of the vehicle body frame 10. Therefore, the use of the structure in which the image capturing unit 16A and the radar 16B are supported by the main frames 31 makes it possible to improve the support rigidity of these members, and suppress a shift of the detection range caused when the vehicle 1 is in use.

The image capturing unit 16A and the radar 16B can directly be fixed to the mainframes 31. In this case, however, the degree of freedom of the layout of the image capturing unit 16A and the radar 16B may decrease, or the degree of freedom of the shape of the main frames 31 may decrease. In this embodiment, therefore, the image capturing unit 16A and the radar 16B are supported by the main frames 31 via a stay 36.

The stay 36 functions as a fixing stay of each of the meter panel MP, the headlight unit 11, the image capturing unit 16A, and the radar 16B. By using the single stay 36 as the stays of the meter panel MP, the headlight unit 11, the image capturing unit 16A, and the radar 16B, it is possible to reduce the number of parts and improve the assemblability. Note that different fixing stays may also be used for the meter panel MP, the headlight unit 11, the image capturing unit 16A, and the radar 16B. It is also possible to adopt an arrangement in which one fixing stay is used for the meter panel MP and at least one of the image capturing unit 16A and the radar 16B, or an arrangement in which one fixing stay is used for the headlight unit 11 and at least one of the image capturing unit 16A and the radar 16B.

The stay 36 of this embodiment is formed by fixing plate-like members having bolt fastening holes to a frame body obtained by combining metal pipes. The front end portions of the main frames 31 have four mounting portions 31c to which the stay 36 is fixed. The stay 36 has four mounting portions 361 corresponding to the mounting portions 31c, and corresponding mounting portions 31c and 361 are fixed by bolt fastening.

The upper portion of the stay 36 has four mounting portions 362 to which the meter panel MP is fixed by bolt fastening. The front portion of the stay 36 has four mounting portions 363 to which the headlight unit 11 is fixed by bolt fastening. The central portion of the front portion of the stay 36 has one plate-like mounting portion 364 to which the image capturing unit 16A is fixed by bolt fastening, and two mounting portions 365 to which the radar 16B is fixed by bolt fastening.

Other Embodiments

In the above embodiment, the image capturing unit 16A and the radar 16B are exemplified as detecting devices for detecting the situation in front of the vehicle 1. However, only the image capturing unit 16A may be installed without installing the radar 16B. It is also possible to install another detecting device such as an ultrasonic sensor instead of or in addition to the radar 16B. Furthermore, although one image capturing unit 16A is installed in the above embodiment, a plurality of image capturing units may be installed. In this case, only one of the plurality of image capturing units can be arranged in a position which is higher than the lower end 12a of the front cowl 12 and in the central portion in the Y direction (the vehicle width direction), and at which the shield 13 does not interfere with the image capturing range R1, and other image capturing units can be arranged in different positions.

Figure 7:
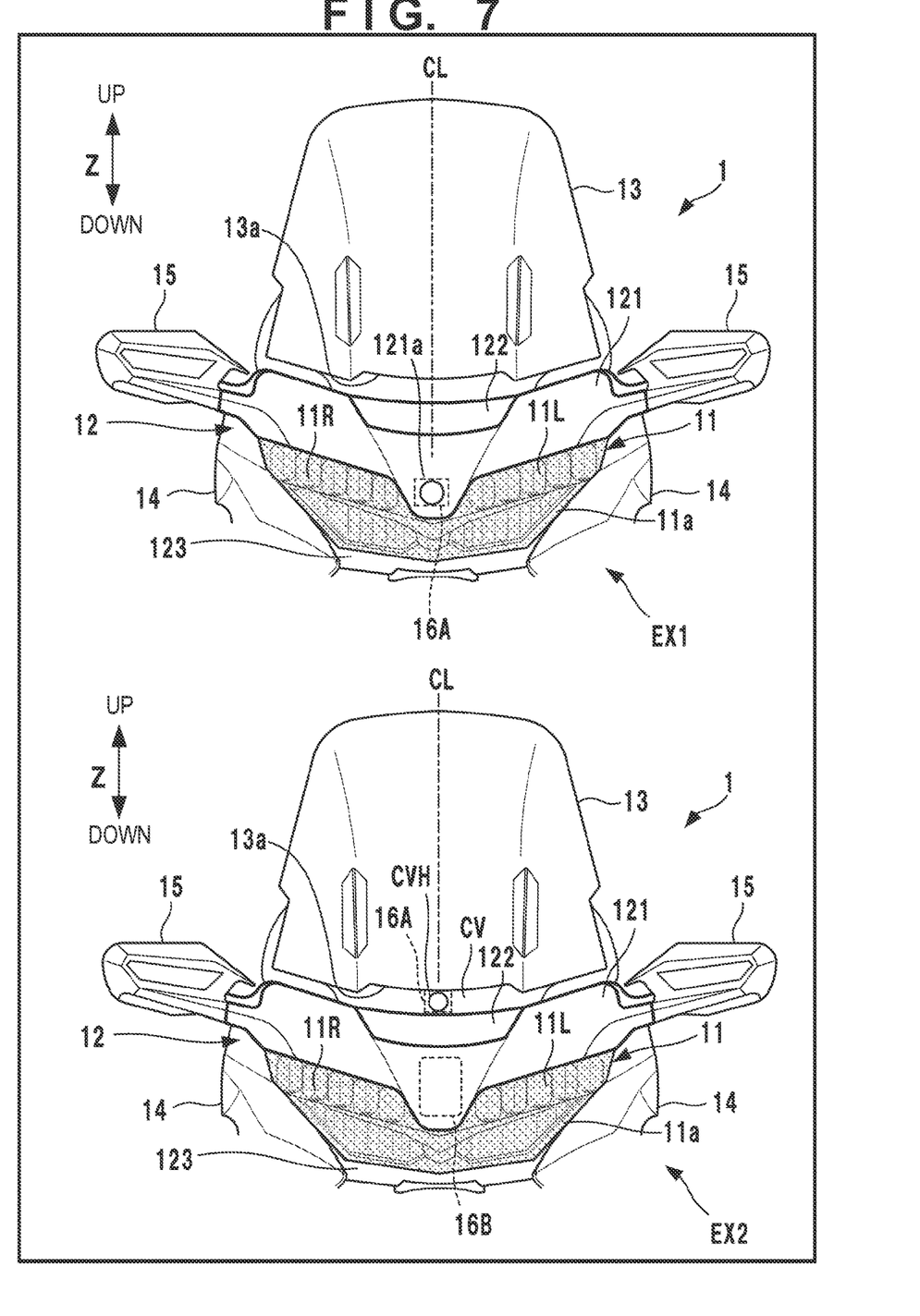
FIG. 7 is a view showing other arrangement examples of a detecting device.

As indicated by arrangement example EX1 in FIG. 7, the image capturing unit 16A may be arranged between the light sources 111R and 111L in the front view of the vehicle 1. This makes it possible to effectively utilize the space between the right and left light sources 111R and 111L. In addition, the position of the image capturing unit 16A in the Z direction overlaps the positions of the right and left light sources 111R and 111L in the Z direction. This can avoid enlargement of the front part of the vehicle 1 in the Z direction.

As indicated by arrangement example EX2 in FIG. 7, the image capturing unit 16A may be arranged in the recess 13a in the front view of the vehicle 1. In arrangement example EX2, the image capturing unit 16A is arranged behind the cover CV, and an opening CV' is formed to extend through the cover CV. The image capturing unit 16A is arranged so that its optical axis is directed in the forward direction of the vehicle 1 through the opening CV'. In arrangement example EX2, the image capturing unit 16A can be arranged in a higher position, so a wider image capturing range can be obtained in some cases. In addition, since the image capturing unit 16A is arranged in the recess 13a, it is possible to avoid an increase in width of the front part of the vehicle 1 in the vertical direction while suppressing interference of the screen 13 to the image capturing range.

In this embodiment, the lens member 11a of the headlight unit 11 is a single member so formed as to cover both the light emitting units 11R and 11L. However, the lens member 11a may be divided into two members, that is, a member that covers the light emitting unit 11R, and a member that covers the light emitting unit 11L. Arrangement examples EX3 and EX4 in FIG. 8 indicate arrangements of the image capturing unit 16A and the like when the lens member 11a includes two members.

Figure 8:
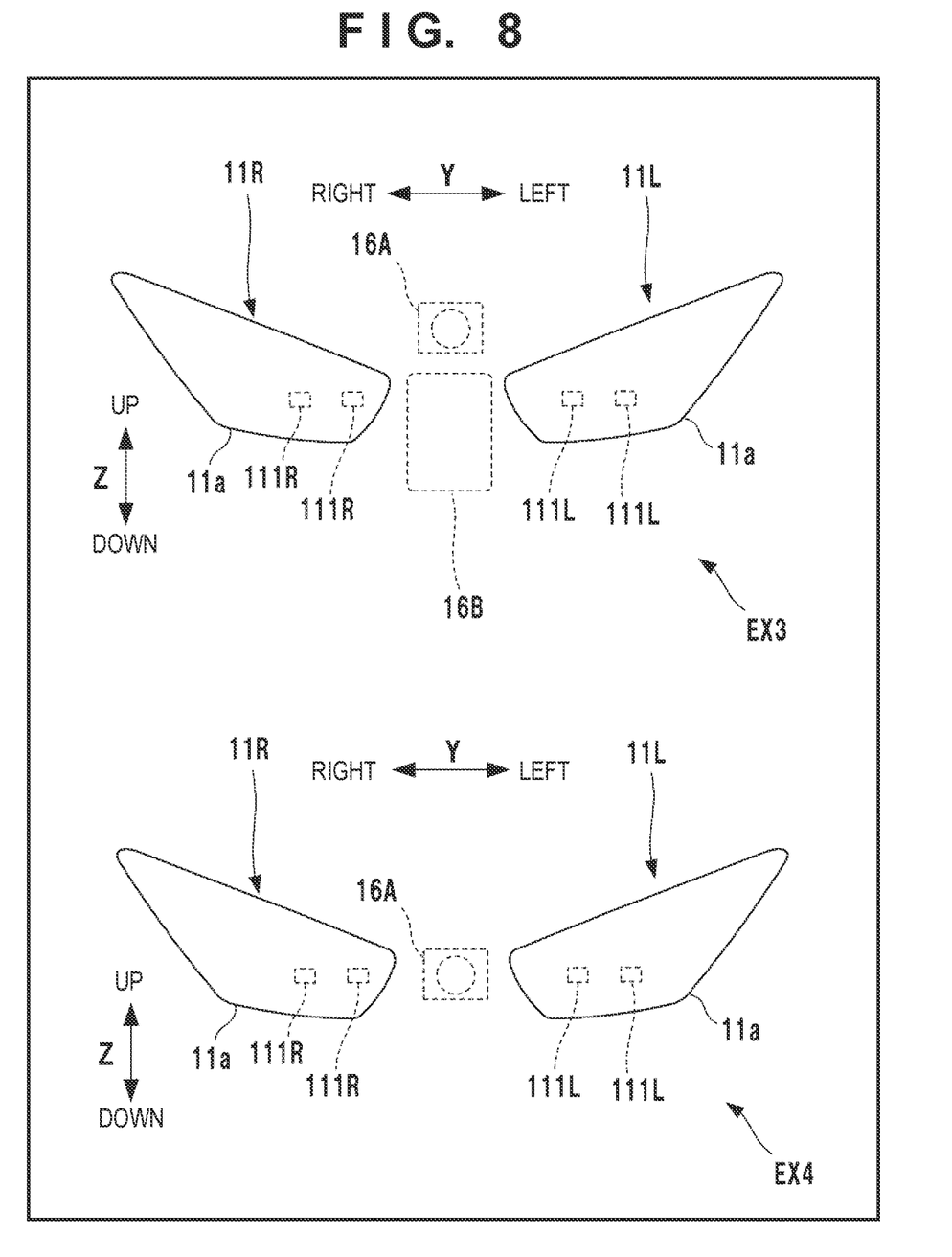
FIG. 8 is a view showing other arrangement examples of the detecting device.

In arrangement example EX3, the image capturing unit 16A and the radar 16B are arranged between the right and left lens members 11a in the front view of the vehicle 1. Compared to the example shown in FIG. 3, the positions of the image capturing unit 16A and the radar 16B in the Z direction further overlap the positions of the right and left lens members 11a or the positions of the light sources 111R and 111L in the Z direction. This can avoid enlargement of the front part of the vehicle 1 in the Z direction as well.

In arrangement example EX4, the image capturing unit 16A is arranged between the right and left lens members 11a, particularly, between the light sources 111R and 111L, in the front view of the vehicle 1. The space between the right and left lens members 11a can be utilized as the installation space of the image capturing unit 16A.

Note that the headlight unit 11 may also be independent right and left headlight units instead of an integrated structure of right and left headlight units. In this case, at least one of the image capturing unit 16A and the radar 16B can be arranged between the right and left headlight units.

The present invention is not limited to the above embodiments and various changes and modifications can be made within the spirit and scope of the present invention. Therefore, to apprise the public of the scope of the present invention, the following claims are made.

What is claimed is:

1. A straddle type vehicle comprising:
   a front cowl configured to cover a front part of the straddle type vehicle;
   a shield which is a separate member from the front cowl and is arranged above the front cowl; and
   an image capturing sensor configured to detect a situation in front of the straddle type vehicle,
   wherein the image capturing sensor unit is positioned above a lower end of the front cowl and in a central portion of the straddle type vehicle in a vehicle width direction,
   the image capturing sensor is arranged behind an upper portion of the front cowl, and
   a lower edge of the shield includes a recess that recesses upward so that the shield does not interfere with an image capturing range of the image capturing sensor.

2. The straddle type vehicle according to claim 1, further comprising a headlight unit including a lens member and configured to emit light in a forward direction of the straddle type vehicle,
   wherein the image capturing unit is arranged outside the headlight unit.

3. The straddle type vehicle according to claim 1, further comprising left and right light emitting units, each of which includes an LED configured to emit light in a forward direction of the straddle type vehicle,
   wherein the image capturing sensor is positioned between the LED of the light emitting unit on a left side and the LED of the light emitting unit on a right side, in the front view of the straddle type vehicle.

4. The straddle type vehicle according to claim 1, further comprising a vehicle body frame including a main frame extending in a vehicle longitudinal direction,
   wherein the image capturing sensor is supported by the main frame.

5. The straddle type vehicle according to claim 4, wherein the image capturing sensor is supported by the main frame via a stay.

6. The straddle type vehicle according to claim 5, further comprising a headlight unit including a lens member and configured to emit light in a forward direction of the straddle type vehicle,
   wherein the stay is a headlight stay that supports the headlight unit.

7. The straddle type vehicle according to claim 5, further comprising a meter unit configured to display information for a rider,
   wherein the stay is a meter stay that supports the meter unit.

8. The straddle type vehicle according to claim 1, further comprising
   a radar arranged behind the central portion of the front cowl,
   wherein the image capturing sensor is arranged above the radar.

* * * * *